United States Patent
Voelkel

(10) Patent No.: US 11,052,756 B2
(45) Date of Patent: Jul. 6, 2021

(54) DRIVE DEVICE COMPRISING AN ELECTRICAL MACHINE AND A RING GEAR CUP

(71) Applicant: Schaeffler Technologies AG & Co. KG, Herzogenaurach (DE)

(72) Inventor: Franz Voelkel, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/961,979

(22) PCT Filed: Jan. 7, 2019

(86) PCT No.: PCT/DE2019/100007
§ 371 (c)(1),
(2) Date: Jul. 14, 2020

(87) PCT Pub. No.: WO2019/144986
PCT Pub. Date: Aug. 1, 2019

(65) Prior Publication Data
US 2021/0086610 A1    Mar. 25, 2021

(30) Foreign Application Priority Data
Jan. 23, 2018 (DE) ........... 10 2018 101 410.4

(51) Int. Cl.
| | | |
|---|---|---|
| *F16H 1/46* | (2006.01) |
| *B60K 17/16* | (2006.01) |
| *F16H 57/037* | (2012.01) |
| *F16H 48/10* | (2012.01) |
| *F16H 37/04* | (2006.01) |

(Continued)

(52) U.S. Cl.
CPC ............ *B60K 17/165* (2013.01); *B60K 1/00* (2013.01); *F16H 1/46* (2013.01); *F16H 37/041* (2013.01); *F16H 48/10* (2013.01); *F16H 57/037* (2013.01); *B60K 2001/001* (2013.01);
(Continued)

(58) Field of Classification Search
CPC .. B60K 17/165; B60K 1/00; B60K 2001/001; F16H 48/10; F16H 37/041; F16H 1/46; F16H 57/037; F16H 57/0006; F16H 2057/02034; F16H 2057/02052; F16H 2702/02
See application file for complete search history.

(56) References Cited

U.S. PATENT DOCUMENTS

| | | | |
|---|---|---|---|
| 5,409,425 A * | 4/1995 | Shibahata | F16H 3/73 475/5 |
| 2017/0114871 A1* | 4/2017 | Linton | F16H 3/728 |

FOREIGN PATENT DOCUMENTS

| | | |
|---|---|---|
| DE | 69301386 T2 | 6/1996 |
| DE | 19853459 A1 | 6/2000 |

(Continued)

*Primary Examiner* — Justin Holmes
(74) *Attorney, Agent, or Firm* — Reid A. Baldwin

(57) ABSTRACT

A drive device for a motor vehicle includes an electrical machine which is operatively connected to a transmission device via a drive shaft. The transmission device has at least a first and a second planetary stage and a differential stage. Each planetary stage includes a planet set having a plurality of planet gears, the planet gears being rotatably arranged on a planet carrier and meshing with a sun gear and with a ring gear. The second ring gear has external teeth which mesh with internal teeth of a ring gear cup fixed to a housing in a stationary manner.

15 Claims, 1 Drawing Sheet

(51) Int. Cl.
    *B60K 1/00*          (2006.01)
    *F16H 57/00*       (2012.01)
    *F16H 57/02*       (2012.01)

(52) U.S. Cl.
    CPC .................... *F16H 57/0006* (2013.01); *F16H 2057/02034* (2013.01); *F16H 2057/02052* (2013.01); *F16H 2702/02* (2013.01)

(56) References Cited

FOREIGN PATENT DOCUMENTS

| | | | | |
|---|---|---|---|---|
| DE | 102012024752 | A1 | 6/2014 | |
| DE | 102014202494 | A1 | 6/2015 | |
| DE | 102014213142 | A1 | 1/2016 | |
| DE | 102014221123 | A1 | 4/2016 | |
| DE | 102018101408 | B3 * | 10/2018 | ............. B60K 17/08 |
| DE | 102018101410 | B3 | 10/2018 | |
| FR | 1249299 | A | 12/1960 | |
| JP | 2015218804 | A | 12/2015 | |

\* cited by examiner

DRIVE DEVICE COMPRISING AN ELECTRICAL MACHINE AND A RING GEAR CUP

CROSS-REFERENCE TO RELATED APPLICATIONS

This application is the U.S. National Phase of PCT Appln. No. PCT/DE2019/100007 filed Jan. 7, 2019, which claims priority to DE 10 2018 101 410.4 filed Jan. 23, 2018, the entire disclosures of which are incorporated by reference herein.

TECHNICAL FIELD

The disclosure relates to a drive device with an electrical machine, in particular for an electrically driven motor vehicle.

BACKGROUND

DE 10 2014 213 142 A1, for example, shows a drive device for a motor vehicle with a drive motor and a double differential connected thereto. The double differential consists of a first and a second differential. A drive torque is introduced into the double differential via an exterior wheel which is connected to a planet carrier of the first differential. The first differential consists of the planet carrier on which a first and a second planet set are rotatably mounted, with the respective planet sets intermeshing in pairs. The planets of the first planet set also intermesh with a first ring gear, which simultaneously intermeshes with a first planet set of the second differential and thus connects the first differential with the second differential in terms of gearing. In addition to the first planet set, the second differential has a second planet set, such that the two planet sets are rotatably mounted on a common planet carrier of the second differential and such that the planets of the two planet sets intermesh in pairs.

DE 10 2012 024 752 A1 describes a transmission gear and differential gear with a ring gear of the load stage fixed to the housing and a ring gear of the input stage which can be fixed to the housing via a coupling device.

DE 693 01 386 T2 describes a housing structure of a drive system for an electric vehicle.

DE 10 2014 221 123 A1 describes an electric drive with a gear section with a planetary load stage and a planetary input stage and with a housing consisting of a housing base and a housing sleeve, the housing sleeve forming one section as a load ring gear and one section as an input ring gear.

SUMMARY

It is desirable to further develop a drive device with an electrical machine, in particular to improve the acoustic properties of a meshing on a ring gear.

A drive device for a motor vehicle comprises an electrical machine which is operatively connected to a transmission device via a drive shaft, the transmission device having at least a first and second planetary stage and a differential stage, the first planetary stage having a first planet set with a plurality of planet gears, the planet gears of the first planet set being rotatably arranged on a first planet carrier and being meshed with a first sun gear and with a first ring gear, such that the second planetary stage has a second planet set with a plurality of planet gears, such that the planet gears of the second planet set are rotatably arranged on a second planet carrier and are mesh with both a second sun gear and a second ring gear and such that the second ring gear has external teeth which mesh with first internal teeth of a ring gear cup fixed in a stationary manner to a housing.

In other words, the ring gear meshes with both the second gear wheel and the internal teeth of the ring gear cup. This causes the ring gear to intermesh radially between the second gear wheel and the ring gear cup.

A ring gear cup is a transmission element which is at least partly cup-shaped or cylindrical and has at least one set of internal teeth on an inner circumferential surface which is provided for meshing with at least one gearing of another drive element. The ring gear cup wheel is conically shaped. In particular, the ring gear cup is connected to the transmission device housing via fasteners provided for this purpose. The coupling between ring gear and housing by means of the ring gear cup serves in particular for vibration decoupling and thus for acoustic optimization of the meshing gears at the ring gear.

The term "operationally connected" means that two transmission elements may be directly connected or that there are other transmission elements between two transmission elements, e.g., one or more shafts or gear wheels. Two meshing or intermeshing gear wheels are provided to transmit torque and speed from one gear wheel to the other gear wheel. By a gear wheel we mean, for example, a planet gear of a planetary gear set, a sun gear, a ring gear and a planet gear of a spur gear train.

In a variant shown in FIG. 1, the first ring gear is non-rotatably connected to the second planet carrier. The first and second planetary stages in particular are spatially arranged within the ring gear cup.

According to an exemplary embodiment, the first ring gear has external teeth which mesh with second internal teeth of the ring gear cup, which are fixed to the housing in a stationary manner. The ring gear cup therefore has two sets of internal teeth, which are preferably axially separated from each other. Alternatively, it is also possible to form continuous internal teeth on the ring gear cup, which mesh with the external teeth of the first ring gear as well as with the external teeth of the second ring gear.

In particular, the differential stage is designed as a spur gear differential and consists of a first and a second spur gear train with corresponding planetary gears, the differential stage being provided to distribute an input power of the electrical machine to a first and a second output shaft. Preferably, the planet gears of the first spur gear train mesh with gearing on the first output shaft, the planet gears of the second spur gear train mesh with gearing on the second output shaft and the planet gears of both spur gear trains are rotatably arranged on a third planet carrier and mesh with each other in pairs.

In addition, the electrical machine preferably has a stator and a rotor, with the rotor being connected to the drive shaft in a rotationally fixed manner. Consequently, the drive shaft is designed as a rotor shaft.

The electrical machine may be arranged coaxially to the differential stage. In particular, the electrical machine is arranged coaxially to the two output shafts of the transmission device. Preferably, the input shaft is designed as a hollow shaft, such that the first output shaft is guided axially through the input shaft. Alternatively, the second output shaft can also be guided axially through the input shaft which is designed as a hollow shaft. Preferably the two output shafts are arranged on a common drive axle.

The drive shaft is connected to the sun gear in a way that prevents relative rotation. This couples the electrical machine with the first planetary stage and thus with the transmission device.

Preferably, the first planet carrier is connected to the second sun gear in a rotationally fixed manner. This couples the first planetary stage with the second planetary stage.

In addition, the second planet carrier is preferably torsionally rigidly connected to the third planet carrier. This couples the second planetary stage with the differential stage.

BRIEF DESCRIPTION OF THE DRAWINGS

Further measures are described below together with two exemplary embodiments using the two figures. Herein

DETAILED DESCRIPTION

Figure 2:
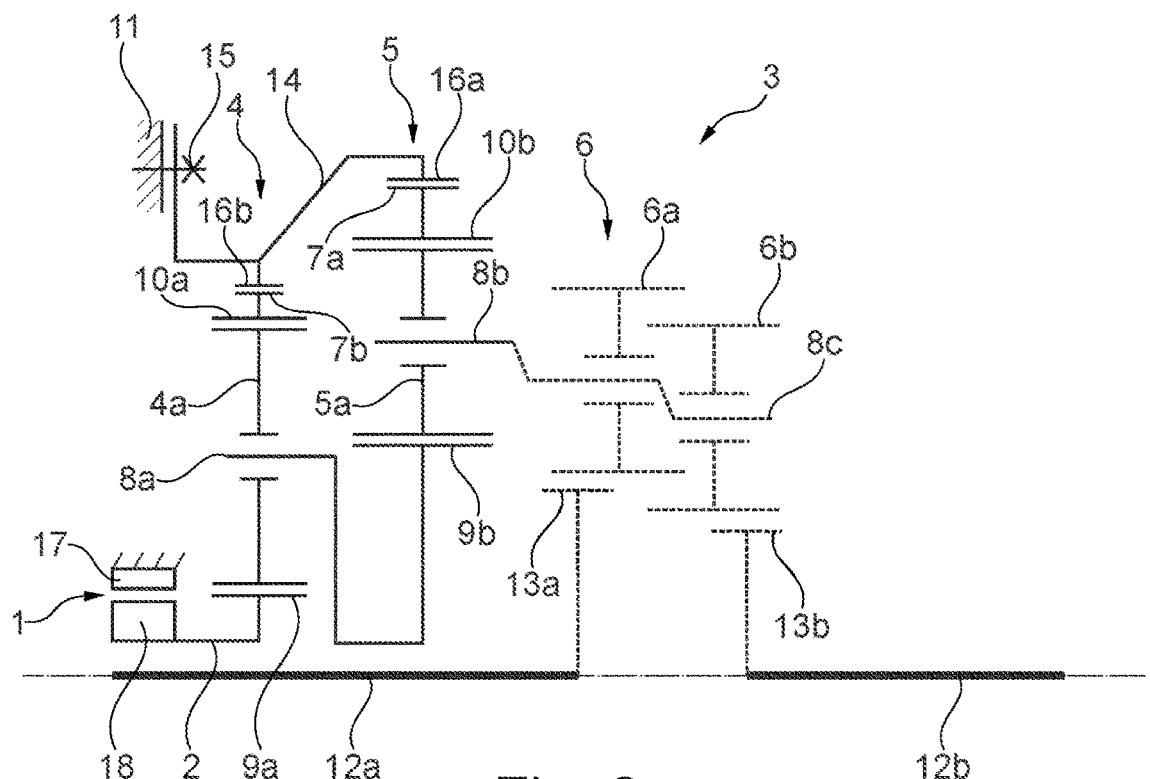
FIG. 2 shows a simplified schematic diagram to illustrate the structure of a drive unit.

According to FIG. 2, the drive device for a motor vehicle consists of an electrical machine 1 and a transmission device 3. The electrical machine 1 is provided to be the drive machine and has a stator 17 and a rotor 18. A drive power of the electrical machine 1 is transmitted to the transmission device 3 via a drive shaft 2, which is arranged between the electrical machine 1 and the transmission device 3 and designed as a rotor shaft. Thus a speed and torque for driving the vehicle is fed into the transmission device 3 via the drive shaft 2. The transmission device 3 consists of a first and second planetary stage 4, 5 and a differential stage 6.

The differential stage 6 is designed as a spur gear differential and has a first and second spur gear train with corresponding planetary gears 6a, 6b. The differential stage 6 is provided so that an input power of the electrical machine 1 is distributed to a first and second output shaft 12a, 12b of the transmission device 3. The input shaft 2 is arranged coaxially to the two output shafts 12a, 12b. For this purpose, input shaft 2 is designed as a hollow shaft, with the first output shaft 12a passing through input shaft 2. In addition, the electrical machine 1 is arranged coaxially to the differential stage 6.

The second planetary stage 5 has a second planet set with several planet gears 5a, such that the planet gears 5a of the second planet set are rotatably arranged on a second planet carrier 8b and mesh with a second sun gear 9b and with a second ring gear 10b. The second planet carrier 8b is non-rotatably connected to the third planet carrier 8c. The second ring gear 10b has external teeth 7a which mesh with first internal teeth 16a of a ring gear cup 14 attached to a housing 11 in a stationary manner. The ring gear cup wheel 14 is conical and connected to the housing 11 via the fixing elements 15 provided therefor. Only one fixing element 15 is shown.

The first planetary stage 4 has a first planet set with several planet gears 4a, such that the planet gears 4a of the first planet set are rotatably arranged on a first planet carrier 8a and mesh with a first sun gear 9a and a first ring gear 10a.

Figure 1:
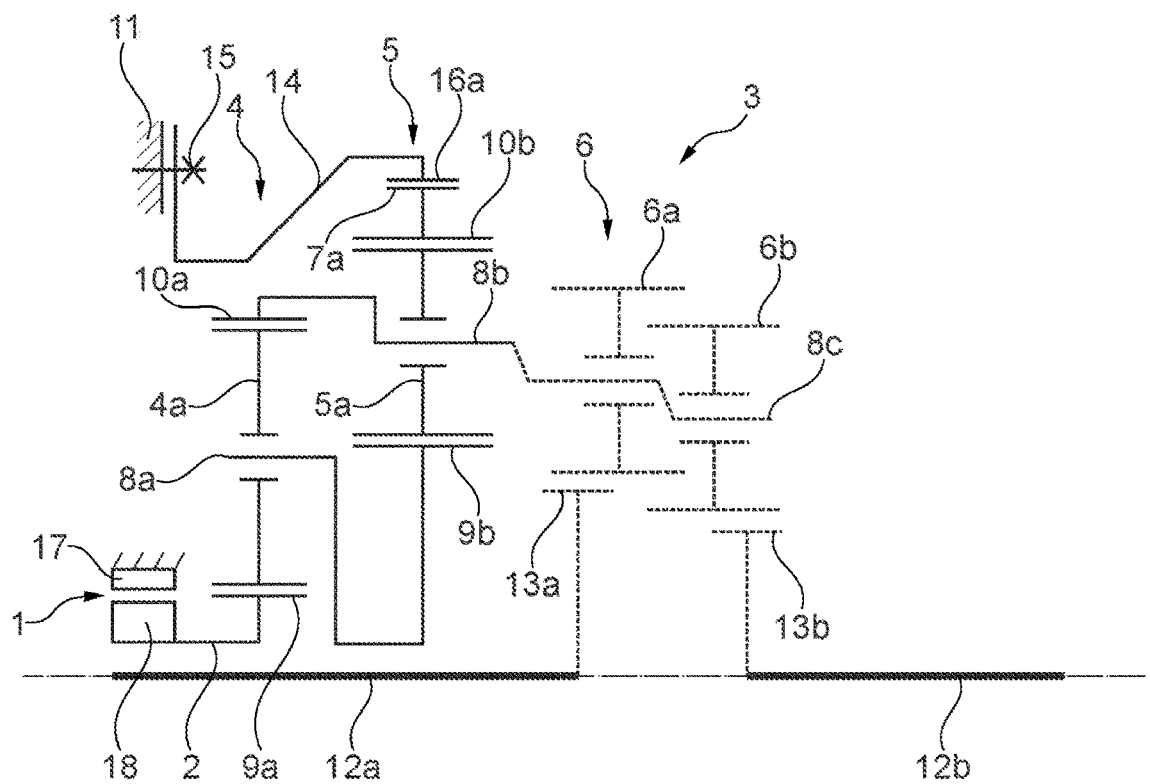
FIG. 1 shows a simplified schematic representation of a drive device.

According to FIG. 1, the first ring gear 10a is connected to the second planet carrier 8b in a rotationally fixed manner. The drive shaft 2 is connected to the first sun gear 9a and the first planet carrier 8a is connected to the second sun gear 9b. The ring gear cup 14 encloses the first and second planetary stages 4, 5.

As shown in FIG. 2, the first ring gear 10a has external teeth 7b which mesh with second internal teeth 16b of the ring gear cup 14 which is fixed to the housing 11 in a stationary manner. The ring gear cup 14 encloses the first and second planetary stages 4, 5. The drive shaft 2 is connected to the first sun gear 9a and the first planet carrier 8a is connected to the second sun gear 9b.

LIST OF REFERENCE SYMBOLS

1 Electrical machine
2 Drive Shaft
3 Transmission device
4 First planetary stage
4a Planet gear
5 Second planetary stage
5a Planet gear
6 Differential stage
6a, 6b Planet gear
7a, 7b External teeth
8a, 8b, 8c Planet carrier
9a, 9b Sun gear
10a, 10b, 10c Ring gear
11 Housing
12a, 12b Output shaft
13a, 13b Gearing
14 Ring gear cup
15 Fixing element
16a, 16b Internal teeth
17 Stator
18 Rotor

The invention claimed is:

1. A drive device for a motor vehicle, comprising a housing a conically formed ring gear cup fixedly attached to the housing in a stationary manner and an electrical machine which is operatively connected to a transmission device via a drive shaft, the transmission device having at least a first and second planetary stage and a differential stage, the first planetary stage having a first planet set with a plurality of planet gears, such that the planet gears of the first planet set are rotatably arranged on a first planet carrier and mesh with a first sun gear and with a first ring gear, such that the second planet stage comprises a second planet set with several planet gears, such that the planet gears of the second planet set are rotatably arranged on a second planet carrier, and mesh with a second sun gear and with a second ring gear, and such that the first and second planetary stages are arranged spatially inside the ring gear cup, the second ring gear has external teeth meshing with first internal teeth of the ring gear cup, and the first ring gear has external teeth which mesh with second internal teeth of the ring gear cup.

2. The drive device according to claim 1, wherein the differential stage is a spur gear differential comprising a first and second spur gear train with respective planetary gears the differential stage being provided for distributing a drive power of the electrical machine to a first and second output shaft.

3. The drive device according to claim 2, the planet gears of the first spur gear train mesh with a gear on the first output shaft, the planet gears of the second spur gear train meshing with a gear on the second output shaft, and the planet gears of both spur gear sets are rotatably arranged on a third planet carrier and mesh with each other in pairs.

4. The drive device according to claim 1, wherein the electrical machine comprises a stator and a rotor, the rotor being connected to the drive shaft in a rotationally fixed manner.

5. The drive device according to claim 2, wherein the electrical machine is arranged coaxially with the differential stage, the drive shaft being constructed as a hollow shaft and the first output shaft being guided through the drive shaft.

6. The drive device according to claim 1, wherein the drive shaft is connected to the first sun gear in a rotationally fixed manner.

7. The drive device according to claim 1, wherein the first planet carrier is connected to the second sun gear in a rotationally fixed manner.

8. The drive device according to claim 1, wherein the second planet carrier is connected to the third planet carrier in a rotationally fixed manner.

9. A drive device for a motor vehicle, comprising:
   a housing;
   a conically formed ring gear cup fixedly attached to the housing in a stationary manner;
   a first planetary gear set having a first sun gear, a first carrier, a first ring gear, and a plurality of first planet gears, each first planet gear supported for rotation with respect to the first carrier and meshing with the first sun gear and with internal teeth of the first ring gear, the first ring gear also having external teeth meshing with first internal teeth of the ring gear cup;
   a second planetary gear set having a second sun gear, a second carrier, a second ring gear, and a plurality of second planet gears, each second planet gear supported for rotation with respect to the second carrier and meshing with the second, sun gear and with internal teeth of the second ring gear, the second ring gear also having external teeth meshing with second internal teeth of the ring gear cup; and
   an electrical machine operatively connected to the first planetary gear set via a drive shaft.

10. The drive device according to claim 9 wherein the first and second planetary gear sets are spatially arranged inside the ring gear cup.

11. The drive device according to claim 9, further comprising:
   a first output shaft fixed to a third sun gear;
   a second output shaft fixed to a fourth sun gear; and
   a spur gear differential having a third carrier, a plurality of third planet gears each supported for rotation with respect to the third carrier and meshing with the third sun gear, and a plurality of fourth planet gears each supported for rotation with respect to the third carrier and meshing with the fourth sun gear and one of the third planet gears.

12. The drive device according to claim 11, wherein the electrical machine comprises a stator and a rotor, the rotor fixed to the drive shaft, the rotor and the drive shaft both being hollow and the first output shaft extending through the drive shaft and the rotor.

13. The drive device according to claim 9, wherein the drive shaft is connected to the first sun gear in a rotationally fixed manner.

14. The drive device according to claim 9, wherein the first planet carrier is connected to the second sun gear in a rotationally fixed manner.

15. The drive device according to claim 9, wherein the second planet carrier is connected to the third planet carrier in a rotationally fixed manner.

\* \* \* \* \*